(12) United States Patent
Pattison et al.

(10) Patent No.: US 8,016,527 B2
(45) Date of Patent: Sep. 13, 2011

(54) METHOD FOR MOUNTING LOGISTICS STRIPS TO AN INNER SURFACE OF A STORAGE CONTAINER SIDEWALL

(75) Inventors: David A. Pattison, Clarks Hill, IN (US); Zach Millikan, Cicero, IN (US)

(73) Assignee: Wabash National, L.P.

( * ) Notice: Subject to any disclaimer, the term of this patent is extended or adjusted under 35 U.S.C. 154(b) by 0 days.

(21) Appl. No.: 12/400,978

(22) Filed: Mar. 10, 2009

(65) Prior Publication Data
US 2009/0233022 A1 Sep. 17, 2009

Related U.S. Application Data

(60) Provisional application No. 61/036,142, filed on Mar. 13, 2008.

(51) Int. Cl.
*B60P 7/08* (2006.01)
(52) U.S. Cl. ........ 410/115; 428/131; 428/137; 428/138; 428/156; 428/166; 428/167; 428/172; 410/101; 410/106; 410/108; 296/182.1; 296/186.1; 296/191
(58) Field of Classification Search .................. None
See application file for complete search history.

(56) References Cited

U.S. PATENT DOCUMENTS

| | | | | |
|---|---|---|---|---|
| 3,334,007 A * | 8/1967 | Flagan | ........................... | 428/166 |
| 3,917,338 A * | 11/1975 | Becker | ........................... | 410/116 |
| 4,051,286 A * | 9/1977 | Abbott | ........................... | 428/77 |
| 4,250,596 A * | 2/1981 | Hara et al. | ........................... | 24/289 |
| 5,030,488 A * | 7/1991 | Sobolev | ........................... | 428/35.9 |
| 5,700,118 A * | 12/1997 | Bennett et al. | ........................... | 410/113 |
| 5,860,693 A * | 1/1999 | Ehrlich | ........................... | 296/191 |
| 5,934,742 A * | 8/1999 | Fenton et al. | ........................... | 296/186.1 |
| 5,934,849 A * | 8/1999 | Haire | ........................... | 410/113 |
| 6,106,205 A * | 8/2000 | Haire | ........................... | 410/113 |
| 6,447,631 B1 * | 9/2002 | Schahl et al. | ........................... | 156/304.1 |
| 6,626,622 B2 * | 9/2003 | Zubko | ........................... | 410/113 |
| 6,662,424 B2 | 12/2003 | Ehrlich | | |
| 6,742,974 B2 * | 6/2004 | Haire | ........................... | 410/115 |

(Continued)

FOREIGN PATENT DOCUMENTS

EP 424083 A1 * 4/1991

(Continued)

OTHER PUBLICATIONS

PCT Search Report and Written Opinion for related International Application No. PCT/US2009/036630, dated Apr. 30, 2009 (10 pages).

*Primary Examiner* — Patricia L Nordmeyer
*Assistant Examiner* — Jeff A Vonch

(57) ABSTRACT

A logistics strip defining at least one opening therethrough may be bonded to an inner surface of a storage container side wall. At least one channel may be formed in the inner surface of the side wall. A bonding medium may be applied to an underside of the logistics strip along opposite sides thereof with the at least one opening positioned therebetween. The at least one opening may then be aligned over the at least one channel. The underside of the logistics strip may then be contacted with the inner surface of the side wall such that the bonding medium contacts and bonds to the inner surface of the side wall on both sides of the at least one channel.

16 Claims, 5 Drawing Sheets

U.S. PATENT DOCUMENTS

| | | | |
|---|---|---|---|
| 6,799,927 B2 * | 10/2004 | Wheatley | 410/104 |
| 6,893,075 B2 * | 5/2005 | Fenton et al. | 296/181.1 |
| 7,100,971 B2 * | 9/2006 | Pines | 296/186.1 |
| 7,588,286 B2 * | 9/2009 | Lewallen et al. | 296/186.1 |
| 2007/0110538 A1 * | 5/2007 | Roush et al. | 410/115 |
| 2008/0219796 A1 * | 9/2008 | Yurgevich | 410/115 |

FOREIGN PATENT DOCUMENTS

| | | |
|---|---|---|
| GB | 2387151 A * | 10/2003 |
| WO | WO 9637380 A1 * | 11/1996 |

* cited by examiner

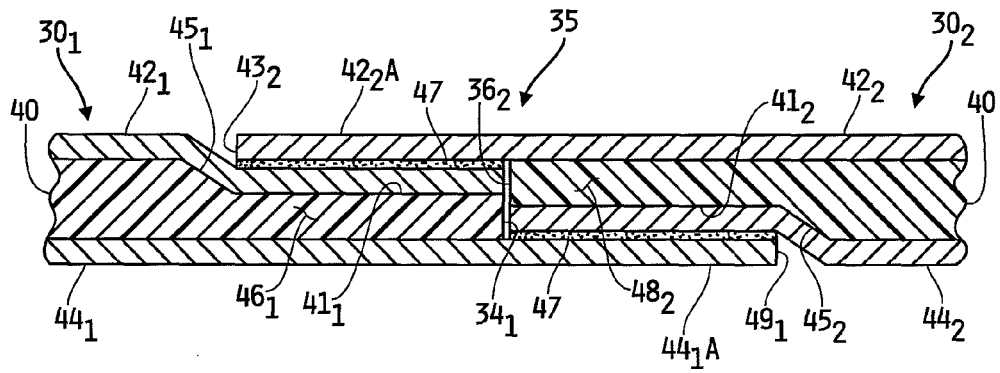
FIG. 3
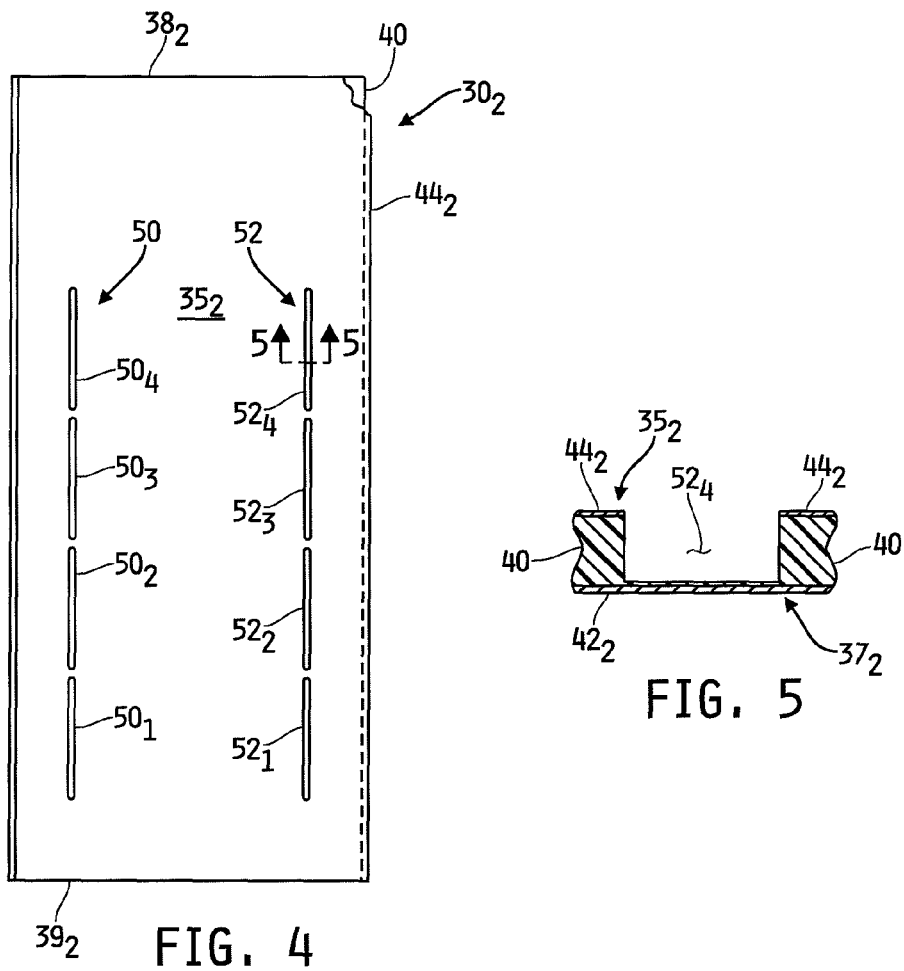
FIG. 4
FIG. 5

METHOD FOR MOUNTING LOGISTICS STRIPS TO AN INNER SURFACE OF A STORAGE CONTAINER SIDEWALL

CROSS REFERENCE TO RELATED APPLICATION

This patent application claims priority to, and the benefit of, U.S. Provisional Patent Application No. 61/036,142 filed Mar. 13, 2008, the disclosure of which is incorporated herein by reference.

FIELD OF THE INVENTION

The present invention relates generally to storage containers such as mobile storage containers, and more specifically to techniques for mounting logistics strips to inner walls of such storage containers.

BACKGROUND

Logistics strips are conventionally formed integrally with storage container walls or are attached to storage container walls at particular locations using elaborate hardware and mounting techniques. It is desirable to provide a simplified process for mounting logistics strips anywhere along the inner surfaces of storage container walls.

SUMMARY

The present invention may comprise one or more of the features recited in the attached claims, and/or one or more of the following features and combinations thereof. A method is provided for bonding a logistics strip defining at least one opening therethrough to an inner surface of a storage container wall. The method may comprise forming at least one channel in the inner surface of the storage container wall, applying a bonding medium to an underside of the logistics strip along opposite sides thereof with the at least one opening positioned between the opposite sides, aligning the at least one opening defined through the logistics strip over the at least one channel, and contacting the underside of the logistics strip with the inner surface of the storage container wall such that the bonding medium contacts and bonds to the inner surface of the wall on both sides of the at least one channel.

The method may further comprise curing the bonding medium to a hardened state.

Forming at least one channel in the inner surface of the storage container wall may comprise forming the at least one channel in an inner surface of at least one of a front, side or rear wall of a trailer mounted to or towed by a motor vehicle.

In one embodiment, forming at least one channel in the inner surface of the storage container wall may comprise forming a plurality of axially aligned channels in the inner surface of the wall, and aligning the at least one opening defined through the logistics strip over the at least one channel may comprise aligning the plurality of openings defined in the logistic strip over corresponding ones of the plurality of axially aligned channels. Alternatively, forming at least one channel in the inner surface of the storage container wall may comprise forming a single elongated channel in the inner surface of the wall, and aligning the at least one opening defined through the logistics strip over the at least one channel may comprise aligning the plurality of openings defined in the logistic strip over the single elongated channel.

The method may further comprise, prior to applying the bonding medium, applying a first strip of adhesive tape to the underside of the logistics strip adjacent to an edge of one of the sides thereof and applying a second strip of adhesive tape to the underside of the logistics strip adjacent to an edge of an opposite one of the sides thereof. Illustratively, the first and second strips of adhesive tape may each have a thickness sufficient to form a dam to leakage or seepage of the bonding medium outwardly away from the sides of the logistics strip. Alternatively or additionally, the first and second strips of adhesive tape may each having adhesive on opposite sides thereof so that the first and second strips of adhesive tape temporarily affix the logistics strip to the inner surface of the wall while the bonding medium cures to a hardened state. In either case, the logistics strip may have a length and the opposite sides may define elongated opposite sides along the length of the logistics strip, and the logistics strip may define a plurality of spaced apart openings along its length between the opposite elongated sides. In one embodiment, forming at least one channel in the inner surface of the storage container wall may comprise forming a plurality of axially aligned channels in the inner surface of the wall, and aligning the at least one opening defined through the logistics strip over the at least one channel may further comprise aligning the plurality of openings defined in the logistic strip over corresponding ones of the plurality of axially aligned channels. Alternatively, forming at least one channel in the inner surface of the storage container wall may comprise forming a single elongated channel in the inner surface of the wall, and aligning the at least one opening defined through the logistics strip over the at least one channel may further comprise aligning the plurality of openings defined in the logistic strip over the single elongated channel.

A logistics strip arrangement may comprise a storage container defining a wall having at least one channel formed in an inner surface thereof, a logistics strip defining at least one opening between opposite sides thereof, and a bonding medium disposed between and in contact with an underside of the logistics strip and the inner surface of the storage container. The bonding medium may extend along both of the opposite sides of the logistics strip with the at least one opening therebetween and may extend along both sides of the at least one channel formed in the inner surface of the storage container such that the at least one opening is aligned over the at least one channel.

The bonding medium may be cured to form a bond to the underside of the logistics strip and to the inner surface of the storage container wall.

The logistics strip may have a length and the opposite sides may define elongated opposite sides along the length of the logistics strip. The logistics strip may define a plurality of spaced apart openings along its length between the opposite elongated sides. The at least one channel in the inner surface of the storage container side wall may comprise a plurality of axially aligned channels in the inner surface of the wall, and the plurality of openings defined in the logistic strip may be aligned over corresponding ones of the plurality of axially aligned channels. Alternatively, the at least one channel in the inner surface of the storage container wall may comprise a single elongated channel in the inner surface of the side wall, and the plurality of openings defined in the logistic strip may be aligned over the single elongated channel.

The storage container may comprise a trailer mounted to or towed by a motor vehicle. The at least one channel may be formed in a front, side or rear wall of the trailer.

The logistics strip arrangement may further comprise a first strip of adhesive tape between the underside of the logistics strip adjacent to an edge of one of the sides thereof and the inner surface of the storage container wall, and a second strip of adhesive tape between the underside of the logistics strip adjacent to an edge of an opposite side thereof and the inner surface of the storage container wall. The first and second strips of adhesive tape may each have a thickness sufficient to form a dam to leakage or seepage of the bonding medium outwardly away from the sides of the logistics strip. Alternatively or additionally, the first and second strips of adhesive tape may each have adhesive on opposite sides thereof so that the first and second strips of adhesive tape temporarily affix the logistics strip to the inner surface of the wall while the bonding medium cures to a hardened state.

The storage container wall may comprise a non-metallic core material sandwiched between two metallic outer skins.

BRIEF DESCRIPTION OF THE DRAWINGS

FIG. 3 is a cross-sectional view of a joint between two adjacent panels of the trailer side wall as viewed along section lines 3-3 of FIG. 2.

FIG. 4 is a front elevational view of one of the trailer side wall panels having one illustrative arrangement of channels formed therein.

FIG. 5 is a cross sectional view of one of the channels as viewed along section lines 5-5 of FIG. 4.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same. While the concepts of this disclosure are described in relation to trailers towed by motor vehicles, it will be understood that they are equally applicable to storage containers generally, and more specifically to transportable containers for transporting one or more objects, straight truck bodies, small personal and/or commercial trailers, trailers mounted to motor vehicles, and the like.

Figure 1:
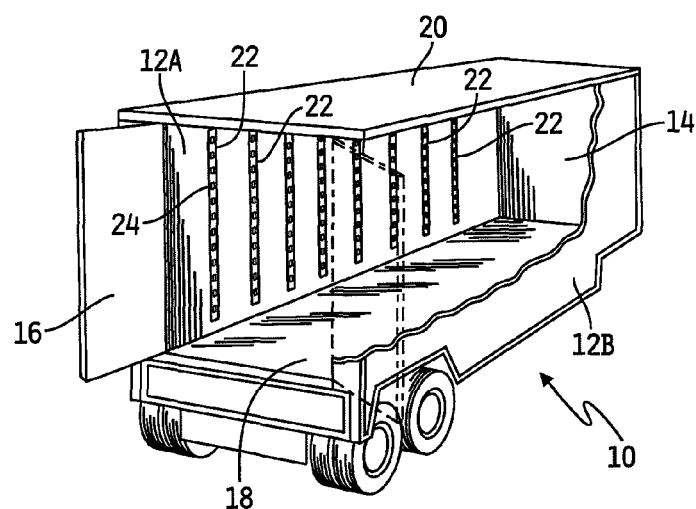
FIG. 1 is a perspective and partial cutaway view of a trailer having a number of logistics strips mounted to an inner surface of one side wall thereof.

Referring now to FIG. 1, a perspective and partial cutaway view is shown of a trailer 10 having a number of logistics strips 22 mounted to an inner surface of one side wall 12A of the trailer. Illustratively, the trailer 10 is a conventional box or van type trailer that is towable by a heavy duty truck, although it will be understood that the logistics strips may be mounted to the inner side wall or side walls other trailer types and/or storage containers generally. In the illustrated embodiment, the trailer 10 includes a pair of opposing side walls 12A and 12B that extend the length of the trailer 10, a front wall 14 attached to and between the side walls 12A and 12B at one end thereof and a rear frame assembly 16 attached to and between the side walls 12A and 12B at an opposite end thereof. A conventional trailer floor 18 extends the length of the trailer 10 between the side walls 12A and 12B, and a roof structure 20 likewise extends the length of the trailer 10 and is attached along the tops of the trailer side walls 12A, 12B, the front wall 14 and the rear frame assembly 16. Each of the logistics strips 22 define a series of axially aligned openings 24 therethrough.

Figure 2:
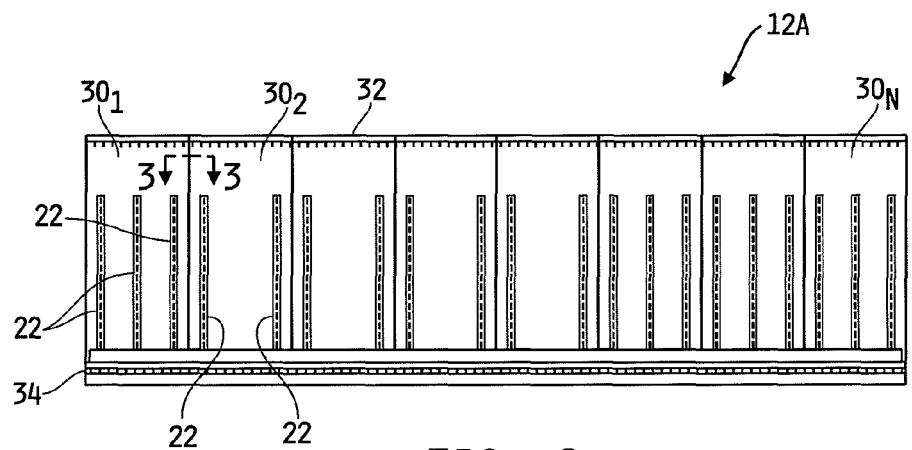
FIG. 2 is an elevational view of one illustrative embodiment of the trailer side wall having a number of logistics strips mounted thereto.

Referring now to FIG. 2, one illustrative embodiment of the trailer sidewall 12A is shown, it being understood that the trailer side wall 12B will generally be identically constructed. The trailer side wall 12A includes a plurality of individual and separate side wall panels $30_1$-$30_N$ arranged in side-by-side relationship and extending along the length of the trailer 10, wherein N may be any positive integer. The side wall panels $30_1$-$30_N$ are configured to be joined together, and to further be secured to a top rail 32 along top edges thereof and to a bottom rail 34 along bottom edges thereof. Any number of logistics strips 22 may be attached or mounted to any one or more of the side wall panels $30_1$-$30_N$ in a manner that will be described in detail hereinafter. In the illustrated embodiment, for example, three such logistics strips 22 are attached in a vertical and spaced-apart orientation to the inner surface of the side wall panel $30_1$, and two such logistics strips 22 are likewise attached in a vertical and spaced-apart orientation to the inner surface of the side wall panel $30_2$. It will be understood that more or fewer such logistics strips 22 may be attached to any one or more of the side wall panels $30_1$-$30_N$ and/or to the inner surface (e.g., ceiling) of the roof 20 in embodiments of the roof 20 that are capable of supporting one or more items attached to the one or more logistics strips 22. It will further be understood that any one or more such logistics strips 22 may be attached to the inner surfaces of the side walls 22A, 22B or ceiling 20 in any orientation, e.g., vertical, horizontal, diagonal, etc.

Referring now to FIG. 3, a cross-sectional view is shown of the side wall assembly 12A of FIG. 2, as viewed along section lines 3-3, to illustrate one illustrative embodiment of the joint 35 between two adjacent panels $30_1$ and $30_2$ of the side wall 12A. It will be understood that the remaining panels $30_3$-$30_N$ of the side wall assembly 12A, as well as all of the side wall panels of the side wall assembly 12B, are illustratively constructed in the same manner as will be described with respect to FIG. 3. Moreover, the joint 35 illustrated in FIG. 3 may also be used to join any or all adjacent side wall panels $30_1$-$30_N$ of the trailer side wall assembly 12A and/or 12B. In any case, the general form of the joint 35 between the adjacent panel sides $30_1$ and $30_2$ of FIG. 3 is known in the industry as a "shiplap" joint. In the illustrated embodiment, each of the side wall panels $30_1$ and $30_2$ includes a core member 40 that is sandwiched between an outer skin 42 and an inner skin 44. The external surface of the outer skin 42 defines the outer surface of the side wall panel, and the external surface of the inner skin 44 defines the inner surface of the side wall panel. The core member 40 of each of the side wall panels $30_1$ and $30_2$ is illustratively formed of a non-metal material, although this disclosure contemplates embodiments in which the core member 40 may include at least some amount of a metallic material or materials. In one illustrative embodiment, the core member 40 is formed of a relatively light weight thermoplastic material, examples of which may include, but should not be limited to, polypropylene, high density polyethylene or the like, although other materials or material combinations for the core member 40 are contemplated. The outer and inner skins 42 and 44 respectively are each bonded to the opposite surfaces of the core member 40 using a conventional adhesive or other conventional bonding medium. The inner and outer skins 42 and 44 respectively may be formed of a metal or metallic composition, examples of which include, but should not be limited to, aluminum, galvanized steel, full hardened steel, such as AISI Grade E steel, or the like. In one illustrative embodiment, for example, the outer skin 42 is formed of ASTM G90 galvanized steel, and the inner skin 44 is formed of ASTM G40 galvanized steel. In alternative embodiments, the inner and/or outer skins 42 and 44 respectively may be formed of other rigid, semi-rigid, metallic or non-metallic materials.

In the specific embodiment illustrated in FIG. 3, the joint 35 between abutting sides $34_1$ and $36_2$ of the side wall panels $30_1$ and $30_2$ respectively is shown. The outer skin of the side wall panel $30_1$ is thus labeled $42_1$, and the outer skin of the side wall panel $30_2$ is similarly labeled $42_2$. The inner skin of the side wall panel $30_i$ is likewise labeled $44_1$, and the inner skin of the side wall panel $30_2$ is similarly labeled $44_2$. In the illustrated embodiment, a portion $42_2$A of the outer skin $42_2$ of the side wall panel $30_2$ extends beyond and along the side $36_2$ of the side wall panel $30_2$ that is defined by terminal edges of the core member 40 and the inner skin $44_2$ of the side wall panel $30_2$, and the portion $42_2$A of the outer skin $42_2$ will generally be referred to in this description as a skin extension of the side wall panel $30_2$. Similarly, a portion $44_1$A of the inner skin $44_1$ of the side wall panel $30_1$ extends beyond and along the side $34_i$ of the side wall panel $30_1$ that is defined by terminal edges of the core member 40 and the outer skin $42_1$ of the panel $30_1$, and the portion $44_1$A of the inner skin $44_1$ of the side wall panel $30_1$ will generally be referred to in this description as a skin extension of the side wall panel $30_1$.

In the embodiment illustrated in FIG. 3, a portion $41_1$ of the surface of the core member 40 of the side wall panel $30_1$ to which the outer skin $42_1$ is bonded is reduced to define a region $46_1$ of reduced thickness of the panel $30_i$ that extends along and inwardly away from the side $34_1$ of the panel $30_1$. In the illustrated embodiment, for example, the surface of the core member 40 of the side wall panel $30_i$ to which the outer skin $42_1$ is bonded defines a downward step or ramp $45_1$ toward the surface of the core member 40 to which the inner skin $44_1$ is bonded, and the step or ramp $45_1$ extends generally parallel to and spaced apart from the side $34_1$ of the panel $30_1$. The region $46_1$ of reduced thickness of the panel $30_1$ is defined between the step or ramp $45_1$ and the side $34_1$ of the side wall panel $30_1$. Illustratively, the surface of the portion $41_1$ of the core member 40 of the side wall panel $30_i$ is reduced approximately uniformly between the step or ramp $45_i$ and the terminal side $34_1$ of the panel $30_1$ such that the region $46_1$ of reduced thickness of the side wall panel $30_1$ defines a region of approximately uniform thickness. The step or ramp $45_1$ may be linear as illustrated in FIG. 3, or may alternatively be piece-wise linear or non-linear, e.g., convex, concave, or the like, and may be configured to step or ramp over any desired distance of the surface of the core member 40 to which the outer skin $42_1$ is bonded, i.e., to provide for a step or ramp that is relatively short, relatively long or somewhere between.

A portion $41_2$ of the surface of the core member 40 of the side wall panel $30_2$ to which the inner skin $44_2$ is bonded is likewise reduced to define a region $48_2$ of reduced thickness of the panel $30_2$ that extends along and inwardly away from the side $36_2$ of the panel $30_2$. In the illustrated embodiment, for example, the surface of the core member 40 of the side wall panel $30_2$ to which the inner skin $44_2$ is bonded defines a downward step or ramp $45_2$ toward the surface of the core member 40 to which the outer skin $42_2$ is bonded, and the step or ramp $45_2$ extends generally parallel to and spaced apart from the side $36_2$ of the panel $30_2$. The region $48_2$ of reduced thickness of the panel $30_2$ is defined between the step or ramp $45_2$ and the side $36_2$ of the side wall panel $30_2$. Illustratively, the surface of the portion $41_2$ of the core member 40 of the side wall panel $30_2$ is reduced approximately uniformly between the step or ramp $45_2$ and the terminal side $36_2$ of the panel $30_2$ such that the region $48_2$ of reduced thickness of the side wall panel $30_2$ defines a region of approximately uniform thickness. As with the step or ramp $45_1$, the step or ramp $45_2$ may be linear as illustrated in FIG. 4, or may alternatively be piece-wise linear or non-linear, e.g., convex, concave, or the like, and may be configured to step or ramp over any desired distance of the surface of the core member 40 to which the inner skin $44_2$ is bonded, i.e., to provide for a step or ramp that is relatively short, relatively long or somewhere between.

As illustrated in FIG. 3, the panels $30_1$ and $30_2$ are oriented relative to each other such that the sides $34_1$ and $36_2$ abut one another with the skin extension $42_2$A of the outer skin $42_2$ of the side wall panel $30_2$ overlapping the region $46_1$ of reduced thickness of the side wall panel $30_1$ and with the skin extension $44_1$A of the inner skin $44_1$ of the side wall panel $30_1$ overlapping the region $48_2$ of reduced thickness of the side wall panel $30_2$. A bonding medium 47 is disposed between the skin extension $42_2$A of the outer skin $42_2$ of the side wall panel $30_2$ and the region $46_1$ of reduced thickness of the side wall panel $26_1$, and also between skin extension $44_1$A of the inner skin $44_1$ of the side wall panel $30_i$ and the region $48_2$ of reduced thickness of the side wall panel $30_2$. The bonding medium 47 bonds the skin extension $42_2$A of the outer skin $42_2$ of the side wall panel $30_2$ to the outer surface of the outer skin $52_1$ of the side wall panel $30_1$ over the region $46_1$ of reduced thickness of the side wall panel $30_1$, and also bonds the skin extension $44_1$A of the inner skin $44_1$ of the side wall panel $30_1$ to the outer surface of the inner skin $44_2$ of the side wall panel $30_2$ over the region $48_2$ of reduced thickness of the side wall panel $30_2$.

Illustratively, the skin extension $42_2$A of the outer skin $42_2$ of the side wall panel $30_2$ and the region $41_1$ of reduced thickness of the side wall panel $30_1$ are both sized such that the skin extension $42_2$A of the outer skin $42_2$ of the side wall panel $30_2$ is received within the region $46_i$ of reduced thickness of the side wall panel $30_1$; i.e., such that the skin extension $42_2$A of the outer skin $42_2$ of the side wall panel $30_2$ is received entirely within the region $46_1$ of reduced thickness of the side wall panel $30_i$ with a terminal end $43_2$ of the skin extension $52_2$A positioned at or near a base of the step or ramp $45_1$. Likewise, the skin extension $44_1$A of the inner skin $44_1$ of the side wall panel $30_1$ and the region $48_2$ of reduced thickness of the side wall panel $30_2$ are both sized such that the skin extension $44_1$A of the inner skin $44_1$ of the side wall panel $30_1$ is received within the region $48_2$ of reduced thickness of the side wall panel $30_2$; i.e., such that the skin extension $44_1$A of the inner skin $44_1$ of the side wall panel $30_1$ is received entirely within the region $48_2$ of reduced thickness of the side wall panel $30_2$ with a terminal end $49_1$ of the skin extension $44_1A$ positioned at or near a base of the step or ramp $45_2$.

Further illustratively, the thickness of the core member 40 in the region $46_1$ of reduced thickness of the side wall panel $30_1$ is selected to be approximately equal to the combined thickness of the skin extension $42_2A$ of the outer skin $42_2$ of the side wall panel $30_2$ and the bonding medium 47. Thus, when the inner surface of the skin extension $42_2A$ of the outer skin $42_2$ of the side wall panel $30_2$ is bonded to the outer surface of the outer skin $42_1$ of the side wall panel $30_1$ over the region $46_1$ of reduced thickness of the side wall panel $30_1$, the outer surfaces of the outer skin $42_2$, the skin extension $42_2A$ and the outer skin $42_1$ adjacent to the region $46_1$ of reduced thickness of the side wall panel $30_1$ are approximately flush with each other as illustrated in FIG. 3. Likewise, the thickness of the core member 40 in the region $42_2$ of reduced thickness of the side wall panel $30_2$ is illustratively selected to be approximately equal to the combined thickness of the skin extension $44_1A$ of the inner skin $44_1$ of the side wall panel $26_1$ and the bonding medium 64. Thus, when the inner surface of the skin extension $44_1A$ of the inner skin $44_1$ of the side wall panel $30_1$ is bonded to the outer surface of the inner skin $44_2$ of the side wall panel $30_2$ over the region $48_2$ of reduced thickness of the side wall panel $30_2$, the outer surfaces of the inner skin $44_1$, the skin extension $44_1A$ and the inner skin $44_2$ adjacent to the region $48_2$ of reduced thickness of the side wall panel $30_2$ are approximately flush with each other as also illustrated in FIG. 3. Thus, except for the small gaps that may exist between the end $43_2$ of the skin extension $42_2A$ and the top of the step or ramp $45_1$ and between the end $49_1$ of the skin extension $44_1A$ and the top of the step or ramp $45_2$, the inner and outer surfaces of the wall panels $30_1$ and $30_2$ are substantially flush with each other. Alternatively, embodiments are contemplated in which only one or the other of the inner and outer surfaces of the wall panels $30_1$ and $30_2$ are configured to be substantially flush with each other.

In one embodiment the bonding medium 47 may be a formable bonding medium that cures to a hardened state. In one embodiment, the formable medium 47 may be or include a conventional adhesive. In one specific embodiment, for example, the formable medium may be provided in the form of a two-part epoxy or acrylic adhesive that cures to a hardened state after mixing the two parts together in a conventional manner. Alternatively, the formable bonding medium may be or include a conventional sealing medium or other conventional bonding medium. In an alternate embodiment, the bonding medium 47 may be provided in the form of strips of a double-sided adhesive tape wherein one or more strips are positioned between the first skin extension and the second region of reduced thickness, and one or more other strips are positioned between the second skin extension and the first region of reduced thickness.

Alternate panel joining structures and techniques that may be used to join together the side wall panels $30_1$-$30_N$ are set forth in U.S. Pat. No. 4,940,279, the disclosure of which is incorporated herein by reference. It will be understood, however, that joining the various side wall panels $30_1$-$30_N$ should not be limited to the shiplap joining technique just described and/or the structures and techniques illustrated in the '279 patent, and that this disclosure further contemplates using other conventional structures and/or techniques for joining together the various side wall panels $30_1$-$30_N$. For example, conventional attachment structures, e.g., logistics rails or strips, may be provided for attaching abutting edges of the side wall panels $30_1$-$30_N$ together. Other examples will occur to those skilled in the art, and such other examples are contemplated by this disclosure.

Those skilled in the art will recognize that while the side wall panels $30_1$-$30_N$ have been shown and described as being positionable in side-by-side relationship to form a trailer side wall assembly with joints between each adjacent pair of side wall panels that extend generally orthogonally between the top and bottom rails 32 and 34 respectively (see FIG. 2), two or more of the side wall panels $30_1$-$30_N$ may be alternatively configured such that joints between such side wall panels extend parallel with, or with some other orientation relative to, the top and bottom rails 32 and 34 respectively. It will further be understood that while the embodiment illustrated in FIG. 3 depicts a small gap between opposing edges $34_1$ and $36_2$ of the side wall panels $30_1$ and $30_2$ respectively, this disclosure contemplates other embodiments in which the gap is at least partially filled with the bonding medium 47 or suitable alternative and/or still other embodiments in which the opposing edges $34_1$ and $36_2$ of the side wall panels $30_1$ and $30_2$ respectively are abutting in contact relationship such that no gap exists therebetween.

Referring now to FIG. 4, a front elevational view of one of the trailer side wall panels, e.g., panel $30_2$, is shown having one illustrative arrangement of channels formed therein. In the illustrated embodiment, two spaced-apart sets of channels 50 and 52 are formed between the top $38_2$ and the bottom $39_2$ of the side wall panel $30_2$, and each of the sets of channels 50 and 52 defines a longitudinal axis therethrough that is generally parallel with the sides (and generally orthogonal with the top $38_2$ and bottom $39_2$) of the side wall $30_2$. The top $38_2$ of the side wall panel $30_2$ is, in the side wall assembly illustrated in FIG. 2, attached to the top rail $32_1$ and the bottom $39_2$ is attached to the bottom rail 34. In one example embodiment, the side wall panel $30_2$ is 48 inches wide between the opposite edges of the core member 40, and is 109 inches tall from the top $38_2$ to the bottom $39_2$. In this embodiment, the channel sets 50 and 52 are each positioned approximately 8.0 inches from a corresponding side of the panel $30_2$ (e.g., from a corresponding edge of the core member 40), and the ends of both channel sets 50 and 52 that are closest in proximity to the bottom end $39_2$ of the panel $30_2$ are positioned approximately 11.75 inches from the bottom end $39_2$. The two channel sets 50 and 52 are further positioned approximately 32 inches on center from each other.

Illustratively, each of the channel sets 50 and 52 is made up of a number of axially aligned channels. In the embodiment illustrated in FIG. 4, for example, the channel set 50 is made up of four axially aligned channels $50_1$-$50_4$ arranged end-to-end, and the channel set 52 is likewise made up of four axially aligned channels $52_1$-$52_4$ arranged end-to-end. Referring to the example dimensions given above, each of the channels $50_1$-$50_4$ and $52_1$-$52_4$ is approximately 16.19 inches long and 0.75 inches wide with approximately 1.81 inches between opposing ends of each adjacent channel. Referring to FIG. 5, a cross-sectional view of a representative one of the channels, e.g., channel $52_4$, is shown as viewed along section lines 5-5 of FIG. 4. In the illustrated embodiment, the channel $52_4$ is a generally rectangular channel formed in the inner surface $35_2$ of the side wall panel $30_2$. Again referring to the example dimensions given above, the width of the channel $52_4$ is approximately 0.75 inches, and the remaining material between the bottom of the channel $52_4$ and the outer surface $37_2$ of the side wall is approximately 0.03 inches in thickness.

Figure 6:
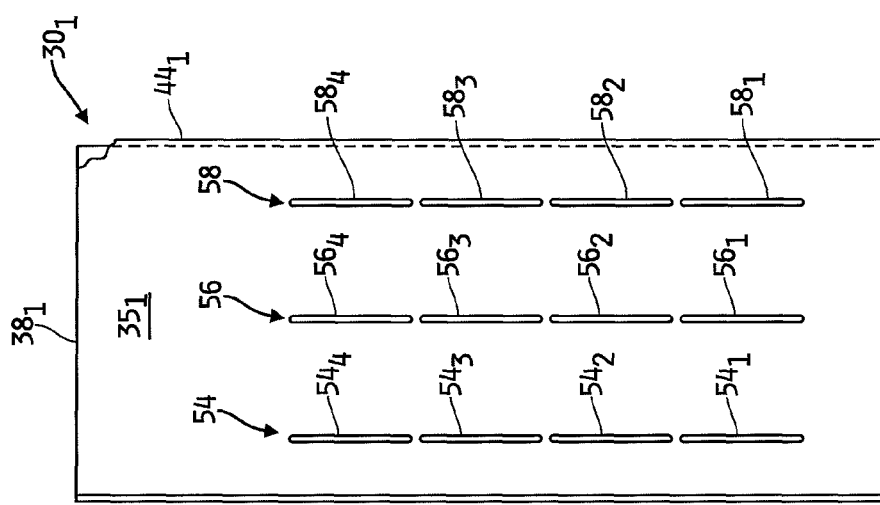
FIG. 6 is a front elevational view of one of the trailer side wall panels having another illustrative arrangement of channels formed therein.

Referring now to FIG. 6, a front elevational view of another of the trailer side wall panels, e.g., panel $30_1$ is shown having another illustrative arrangement of channels formed therein. In the illustrated embodiment, three spaced-apart sets of channels 54, 56 and 58 are formed between the top $38_1$ and the bottom $39_1$ of the side wall panel $30_1$ and each of the sets of channels 54, 56 and 58 is as described above with respect to FIG. 4. The top 38₁ of the side wall panel 30₁ is, in the side wall assembly illustrated in FIG. 2, attached to the top rail 32, and the bottom 39₁ is attached to the bottom rail 34. In one example embodiment, the side wall panel 30₂ is 48 inches wide between the opposite edges of the core member 40, and is 109 inches tall from the top 38₂ to the bottom 39₂. Continuing with the example side wall and channel dimension given above, the channels sets 54 and 58 are, in the illustrated embodiment, each positioned approximately 8.0 inches from a corresponding side of the panel 30₁ (e.g., from a corresponding edge of the core member 40), and the channel set 56 is positioned approximately 16 inches on center from each of the channels sets 54 and 58.

It will be understood that the configurations and arrangements of the various channel sets 50, 52, 54, 56 and 58 illustrated and described herein are provided only by way of example, and that this disclosure contemplates alternate embodiments. In some such alternate embodiments, for example, more or fewer channel sets may be formed in any one side wall panel. Alternatively or additionally, one or more channel sets may be oriented other than vertically with respect to the side wall panel, e.g., horizontal, diagonal or otherwise. Alternatively or additionally still, any one or more of the side wall panels, channel spacing and/or channels themselves may have dimensions other than those set forth herein by example. Alternatively or additionally still, more or fewer (e.g., as few as one, such as in the form of a single, continuous channel) channels may be included in any one channel set.

Figure 8:
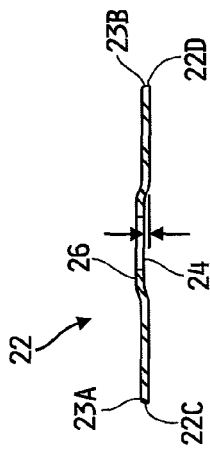
FIG. 8 is a cross-sectional view of the logistic strip as viewed along section lines 8-8 of FIG. 7.
Figure 7:
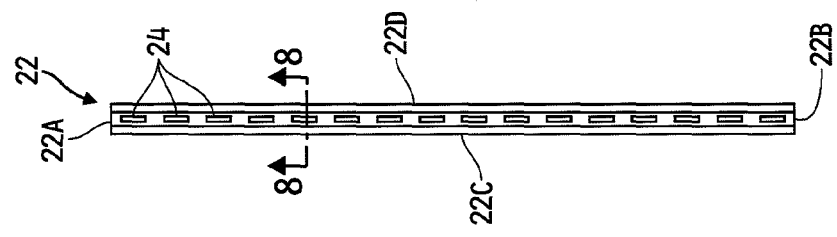
FIG. 7 is a front elevational view of one of the logistics strips illustrated in FIG. 2.

Referring now to FIGS. 7 and 8, a front elevational view is shown in FIG. 7 of one of the logistics strips 20 illustrated in FIG. 2, and in FIG. 8 a cross-sectional view of the logistic strip 20 is shown as viewed along section lines 8-8 of FIG. 7. The logistics strip 20 is an elongate strip having a top 22A, a bottom 22B and opposite sides 22C and 22D defined between the top and bottom. Illustratively, the shoulders 23A and 23B of the strip 20 are rounded or chamfered to reduce snagging of the sides 22C and 22D respectively. Illustratively, the logistics strip 20 is symmetrical about its width and length so that orientation of the logistics strip 20 relative to any channel set 50-58 is not critical. In the illustrated embodiment, the logistics strip 20 defines a raised portion 26 between the two sides 22C and 22D, and a number of rectangular slots or openings 24 are formed through the raised portion 26 along the length of the strip 20. Illustratively, the raised portion 26 is symmetrical relative to the sides 22C and 22D and the slots or openings 24 are formed centrally through the raised portion 26. The logistics strip 20 may be formed of a metal or metallic composition, examples of which include, but should not be limited to, aluminum, galvanized steel, full hardened steel, or the like. In one illustrative embodiment, for example, the logistics strip 20 is formed of 14 GA galvanized steel. In alternative embodiments, the logistics strip 20 may be formed of other rigid, semi-rigid, metallic or non-metallic materials.

In one example embodiment, consistently with the example dimensions provided hereinabove, the logistics strip 20 is approximately 72 inches long and 3.13 inches wide with approximately 16 slots or openings 26 formed therethrough. The raised portion 26 in this embodiment is approximately 1.0 inch in width. In this example embodiment, the raised portion 26 is offset approximately 0.07 inches relative to the sides 22C and 22D. It will be understood, however, that the configuration of the logistics strip 20 illustrated and just described is provided only by way of example, and that this disclosure contemplates alternate embodiments of the logistics strip 20. In some such alternate embodiments, for example, the logistics strip 20 may include more or fewer slots or openings 26 and/or any one or more such slots or openings may have other shapes. Alternatively or additionally, the offset between the raised portion 26 and the sides 20C and 20D may be greater or lesser, and in some embodiments may be omitted entirely so that the logistics strip 20 is substantially flat.

Figure 9:
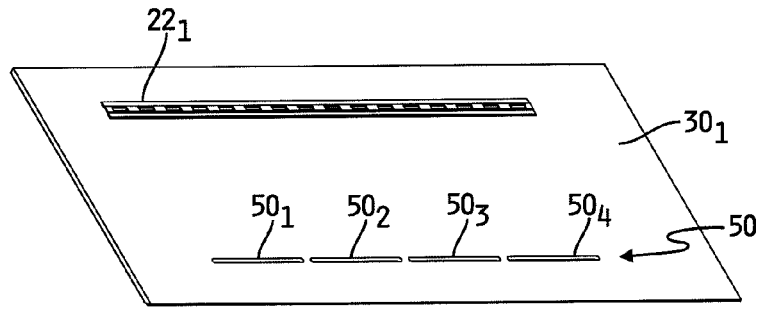
FIG. 9 is a perspective view of a trailer side wall panel having one logistics strip mounted thereto and further having formed therein a series of axially aligned channels.
Figure 10:
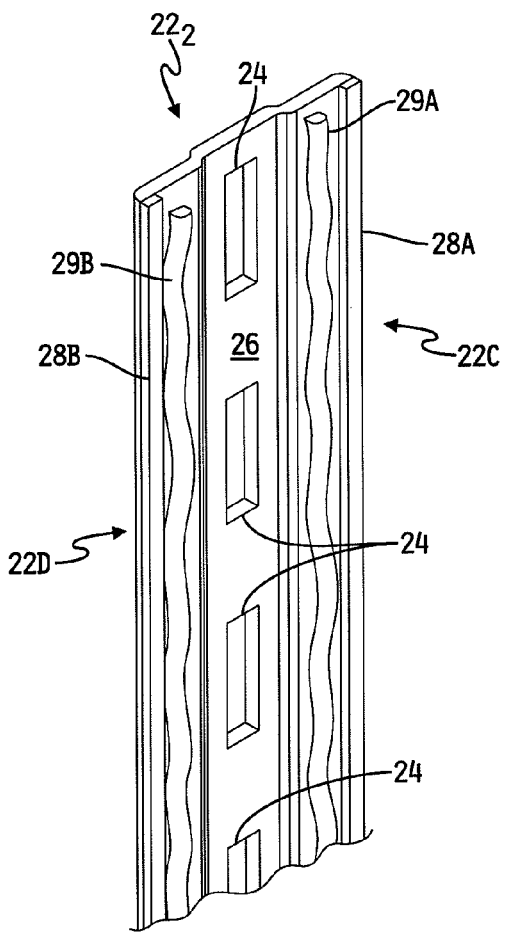
FIG. 10 is a perspective view of an underside of a logistics strip having edging tape and beads of a bonding medium applied thereto.
Figure 11:
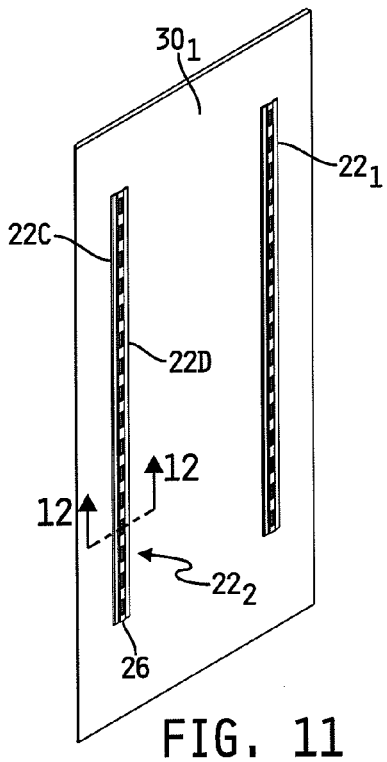
FIG. 11 is a perspective view of the trailer side wall panel of FIG. 9 with the logistics strip of FIG. 10 mounted thereto.
Figure 13:
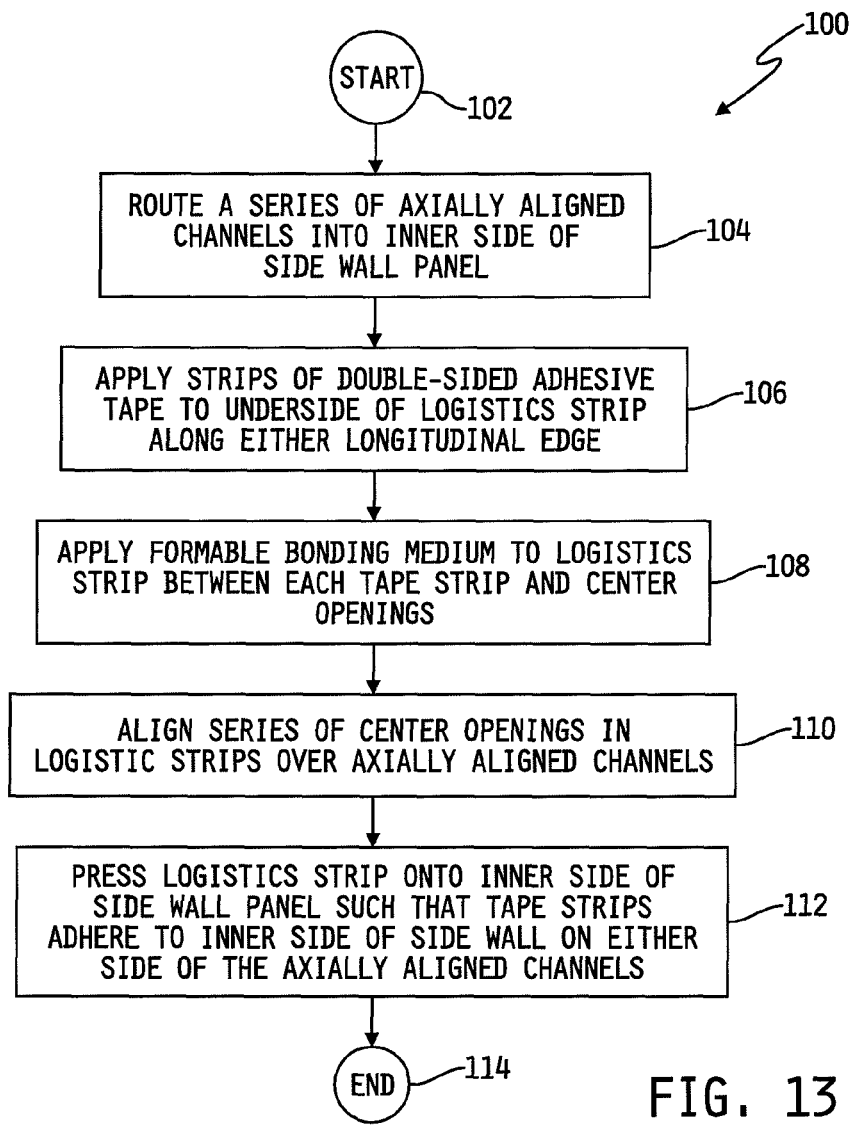
FIG. 13 is a flowchart of one illustrative process for mounting a logistics strip to an inner surface of a trailer sidewall panel as illustrated in FIGS. 9-11.

Referring now to FIG. 13, a flowchart is shown of one illustrative embodiment of a process 100 for mounting a logistics strip 22 to an inner surface of a trailer sidewall panel 30₁. FIGS. 9-11 illustrate the mounting of one of the logistics strips to the side wall panel 30₁ according to the process 100, and the process 100 will accordingly be described using FIGS. 9-11 as visual aids. In the illustrated embodiment, one logistics strip 22₁ is mounted to the side wall 30₁, and the process 100 will be described with respect to the mounting of a second logistics strip 22₂ to the side wall panel 30₁. The process 100 begins at step 102, and thereafter at step 104, a channel set 50 made up of a series of axially aligned channels 50₁-50₄ is routed or otherwise formed into the inner side of the side wall panel 30₁ (see FIG. 9). As described hereinabove, the channel set 50 may alternatively include more or fewer (e.g., as few as one) such channels.

In any case, the process 100 advances from step 104 to step 106 where strips 28A and 28B of adhesive tape are applied to the underside of the logistics strip 22₂ adjacent to and along the longitudinal edges 22C and 22D respectively (see FIG. 10). Alternatively, contact cement or other quick bonding or bond-on-contact medium may be used in place of the adhesive tape strips 28A, 28B. In any case, following step 106, a bead 29A of a formable bonding medium is applied at step 108 to the underside of the logistics strip 22₂ between the strip 28A of adhesive tape and the center slots or openings 24, and another bead 29B of the formable bonding medium is applied to the underside of the logistics strip 22₂ between the strip 28B of adhesive tape and the center slots or openings 24. Illustratively, the adhesive tape strips 28A, 28B are each provided in the form of a sponge-type or other compressible tape having sufficient thickness to provide a dam that prevents leakage or seepage of either of the bonding medium beads 29A, 29B beyond the sides 22C and 22D of the logistics strip 22₂. The formable bonding medium is illustratively an adhesive bonding medium that is configured to cure and harden after application. In one specific embodiment, for example, the bonding medium may be provided in the form of a two-part epoxy or acrylic adhesive that cures to a hardened state after mixing the two parts together in a conventional manner. Alternatively, the formable bonding medium may be or include a conventional sealing medium or other conventional adhesive bonding medium.

Following step 108, the logistics strip 22₂ is aligned relative to the side wall panel 30₁ such that the center openings 24 are generally axially aligned with the channels 50₁-50_N of the channel set 50. Thereafter at step 112, the logistics strip 22₂ is pressed onto the inner side of the side wall panel 30₁ (see FIG. 11) such that the beads 29A, 29B of the bonding medium contact the inner surface of the side wall panel 30₁ on either side of the channel set 50. Thereafter, the process 100 advances to step 114 wherein the process 100 ends.

In one embodiment, the adhesive tape strips 28A, 28B are each double-sided, i.e., each of the strips 28A, 28B have adhesive on opposing sides thereof, so that the tape strips 28A, 28B bond not only to the underside of the logistics strip 20₂ adjacent to and along the longitudinal sides 22C and 22D but also to the inner surface of the side wall panel 30₁ when the logistics strip 20₂ is applied to the inner side of the side wall panel 30₁ as just described. It has been found that such double-sided adhesive tape strips 28A, 28B provide a suitable bond between the logistics strip 22₂ and the inner surface of the side wall panel 30₁ that holds the logistics strip 22₂ in place while the beads 29A, 29B of the bonding medium cures without the need for any further clamping of the logistics strip 22₂ to the side wall panel 30₁. Such double-sided adhesive tape strips 28A, 28B further provide sufficient spacing between the inner surface of the side wall panel 30₁ and the underside of the logistics strip 22₂ to allow the beads 29A, 29B of the bonding medium to spread to a desired thickness before curing to a hardened state.

Figure 12:
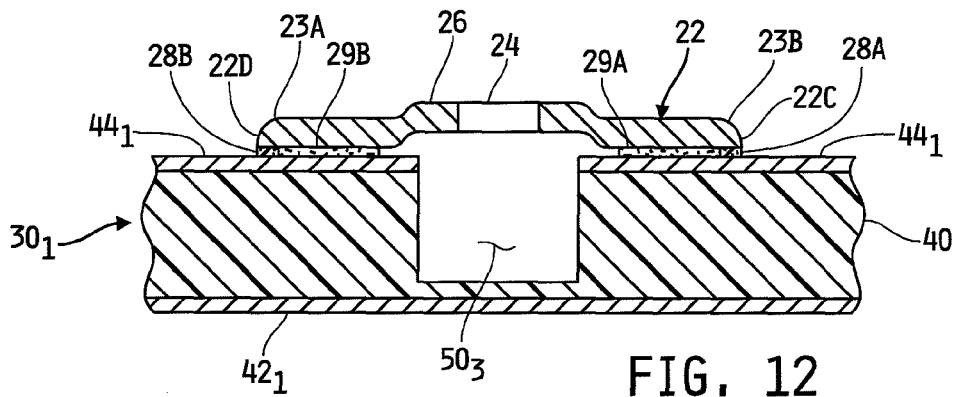
FIG. 12 is a cross-sectional view of the logistics strip and trailer side wall panel as viewed along section lines 12-12 of FIG. 11.

Referring now to FIG. 12, a cross-sectional view of the logistics strip 22₂ and trailer side wall panel 30₁ is shown as viewed along section lines 12-12 of FIG. 11. In the illustrated embodiment, the logistics strip 22₂ is bonded to the side wall panel 30₁ with the slot or opening 24 substantially centered over the channel 50₃ formed in the inner surface of the side wall panel 30₁. This arrangement provides clearance for hooks, pins, clips or other structures that may be inserted into one or more of the slots or openings 24 to allow the logistics strip 22₂, either alone or in combination with one or more logistics strips 22 mounted to an inner surface of either trailer side wall 12A, 12B and/or mounted to an inner surface of the roof 20, to support one or more shelves, pallets or other items and/or to restrain or secure one or more items within the trailer 10. As illustrated in FIG. 12, the double-sided adhesive strips 28A, 28B form a dam to leakage or seepage of the bonding medium beads 29A, 29B outwardly away from the sides 22C and 22D respectively of the logistics strip 22₂, and also bond the sides 22C and 22D of the logistics strip 22₂ to the inner surface of the side wall 30₁ (i.e., to the exposed surface of the inner skin 44₁) while the bonding medium 29A, 29B cures and hardens. Illustratively, the bonding force applied by the double-sided adhesive tape strips 28A, 28B is sufficient to cause the bonding medium beads 29A, 29B to spread or flatten to a desired thickness between the sides 22C, 22D of the logistics strip 22₂ and the skin 44₁ of the side wall panel 30₁ while the bonding medium 29A, 29B cures and hardens.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while this disclosure has been illustrated and described in the context of bonding logistics strips to inner surfaces of trailer side walls, front walls and/or roofs, it will be understood that the bonding techniques described herein are readily applicable to bonding other conventional attachment structures to the inner surfaces of trailer side walls, front walls and/or roofs. Examples of such other conventional attachment structures include, but are not limited to, conventional anchor structures, conventional latches, conventional tether attachment or engagement structures and the like. As another example, while the process illustrated in FIGS. 9-13 includes attaching adhesive strips to the logistic strip, this disclosure contemplates embodiments that do not include any such adhesive strips and that instead mounts one or more logistic strips to one or more storage container walls using only a formable bonding medium, e.g., 29A, 29B. Alternatively still, the adhesive strips may be replaced with one or more mechanical fasteners along either elongated edge 22C, 22D of the logistic strips. Illustratively, such one or more mechanical fasteners would not extend through the side wall panels, although this disclosure contemplates other embodiments in which one or more mechanical fasteners would extend through the side wall panels. As yet another example, the logistics strips 22 may include one or more tabs or other protrusions extending away from the inner surface thereof that is/are positioned to extend into one or more of the channels formed in the trailer side wall, such that the one or more tabs or other protrusions may be used to align the logistics strips relative to the one or more side wall channels. As still another example, one or more mechanical fasteners may extend through either or both ends 22A, 22B of any of the logistics strips 22 and/or along either side 22C, 22D thereof to prevent peeling of a corresponding end or side of the logistic strips 22 away from the side wall, e.g., as a result of mechanical force applied to the corresponding end or side of the strip 22.

What is claimed is:

1. A logistics strip arrangement, comprising:
   a storage container defining a wall having at least one channel formed in an inner surface thereof, wherein the at least one channel only extends partially through the thickness of the wall,
   a logistics strip, the logistics strip including two elongate sides and a raised portions between the two elongate sides, the two elongate sides engaged with the inner surface of the storage container, and defining at least one opening between the opposite sides thereof, and
   a bonding medium disposed between and in contact with an underside of two elongate sides of the logistics strip and the inner surface of the container, the bonding medium extending along both of the opposite sides of the logistics strip with the at least one opening formed therebetween and extending along with the at least one channel formed in the inner surface of the storage container such that the at least one opening is aligned over the at least one channel,
   wherein the raised portion of the logistics strip extends away from the channel and inner surface of the storage container such that a space is provided between a bottom-most surface of the logistics strip aligned with the channel and an inner surface of the storage container.

2. The logistics strip arrangement of claim 1, wherein the at least one channel in the inner surface of the storage container wall comprises a plurality of axially aligned channels in the inner surface of the wall.

3. The logistics strip arrangement of claim 1, wherein the bonding medium is cured to form a bond to the underside of the logistics strip and to the inner surface of the storage container wall.

4. The logistics strip arrangement of claim 1, wherein the logistics strip has a length and the opposite sides define elongated opposite sides along the length of the logistics strip,
   and wherein the logistics strip defines a plurality of spaced apart openings along its length between opposite elongated sides,
   and wherein a plurality of openings define in the logistics strip are aligned over corresponding ones of the plurality of axially aligned channels.

5. The logistics strip arrangement of claim 1, wherein the logistics strip has a length and the opposite sides define elongated opposite sides along the length of the logistics strip,
   and wherein the logistics strip defines a plurality of spaced apart openings along its length between opposite elongated sides,
   and wherein the least one channel defines a plurality of spaced apart openings along its length between opposite elongated sides,
   and wherein the plurality of openings define in the logistics strip are aligned over the single elongated channel.

6. The logistics strip arrangement of claim 1, wherein the storage container comprises a trailer mounted to or towed by a motor vehicle.

7. The logistics strip arrangement of claim 6 wherein the plurality of axially aligned channels are each formed in a front, side or rear wall of the trailer.

8. The logistics strip arrangement of claim 1, further comprising:
- a first strip of adhesive tape between the underside of the logistics strip adjacent to an edge of one of the sides thereof and the inner surface of the storage container wall, and
- a second strip of adhesive tape between the underside of the logistics strip adjacent to an edge of the opposite side thereof and the inner surface of the storage container wall, the first and second strips of adhesive tape each having a thickness sufficient to form a dam to leakage or seepage of the bonding medium outwardly away from the sides of the logistics strip.

9. The logistics strip arrangement of claim 1, further comprising:
- a first strip of adhesive tape between the underside of the logistics strip adjacent to an edge of one of the sides thereof and the inner surface of the storage container wall, and
- a second strip of adhesive tape between the underside of the logistics strip adjacent to an edge of the opposite side thereof and the inner surface of the storage container wall, the first and second strips of adhesive tape each having adhesive on opposite sides thereof so that the first and second strips of adhesive tape temporarily affix the logistics strip to the inner surface of the wall while the bonding medium cures to a hardened state.

10. The logistics strip arrangement of claim 1, wherein the storage container comprises a non-metallic core material sandwiched between two metallic outer skins.

11. The logistics strip arrangement of claim 1, wherein the bonding medium is disposed only along the opposite sides of the logistics strip between the undersides of the logistics strip and the inner surface of the wall such that the channel is free of any bonding medium.

12. The logistics strip arrangement of claim 1, wherein a depth of the channel is greater than half a thickness of the wall.

13. The logistics strip arrangement of claim 1, wherein the bonding medium includes a first bonding medium positioned along an outer longitudinal edge of each of the elongate sides of the logistics strip, and a second bonding medium different from the first bonding medium and positioned between the first bonding medium and the opening of the logistics strip.

14. The logistics strip arrangement of claim 13, wherein the first bonding medium includes a first strip of double-sided adhesive tape coupled to the outer longitudinal edge of one of the elongate sides of the logistics strip and a second strip of double-sided adhesive tape coupled to the outer longitudinal edge of the other one of the elongate sides of the logistics strip, and further wherein the second bonding medium includes a formable bonding medium.

15. The logistics strip arrangement of claim 1, wherein a top portion of the channel is positioned below a top edge of the wall and a bottom portion of channel is positioned below a bottom edge of the wall.

16. The logistics strip arrangement of claim 1, wherein the wall does not include any elongated grooves extending substantially from a top edge of the wall to a bottom edge of the wall.

* * * * *